United States Patent [19]

Farr

[11] Patent Number: 4,733,918

[45] Date of Patent: Mar. 29, 1988

[54] SUSPENSION STRUT ASSEMBLY

[75] Inventor: Glyn P. R. Farr, Leek Wootton, England

[73] Assignee: Lucas Industries public limited company, Birmingham, England

[21] Appl. No.: 868,034

[22] Filed: May 29, 1986

[30] Foreign Application Priority Data

May 29, 1985 [GB] United Kingdom ................ 8513526

[51] Int. Cl.$^4$ .............................................. B60T 8/18
[52] U.S. Cl. .................................. 303/22 R; 188/195
[58] Field of Search .................... 188/195; 267/8 R; 303/22 R, 22 A; 180/290

[56] References Cited

U.S. PATENT DOCUMENTS

| | | | |
|---|---|---|---|
| 2,574,426 | 11/1951 | Trelaskis | 188/195 X |
| 3,199,928 | 8/1965 | Chouings | 303/22 R |
| 3,479,095 | 11/1969 | Lewis et al. | 303/22 R |
| 4,058,347 | 11/1977 | Reinecke | 303/22 R |
| 4,418,800 | 12/1983 | Hess | 188/195 |
| 4,441,590 | 4/1984 | Giorgetti | 303/22 R X |

FOREIGN PATENT DOCUMENTS

| | | | |
|---|---|---|---|
| 2244454 | 3/1973 | Fed. Rep. of Germany | 267/8 R |
| 514192 | 11/1939 | United Kingdom | 303/22 R |
| 852503 | 10/1960 | United Kingdom | 267/8 R |
| 1388421 | 12/1964 | United Kingdom | 303/22 R |
| 2144499 | 3/1985 | United Kingdom . | |

Primary Examiner—George E. A. Halvosa
Attorney, Agent, or Firm—Scrivener and Clarke

[57] ABSTRACT

A vehicle suspension strut 1 comprising a telescopic hydraulic damper 2 and coaxial main suspension spring 3 is fitted with a brake pressure control valve 23. The control member 22 of the valve is acted on by a lever 20 pivotally mounted on a bracket 18 fast with the damper body. The lever 20 supports the end of a tubular support 7 which is movable axially of the damper body and which carries the support plate 9 for the main suspension spring. A compensating spring 12 acts between a ring 13 supported on bracket 18 and an adjustable collar 14 mounted on the tubular element. The compensating spring 12 reacts part of the main suspension spring load onto the damper body, and the remaining suspension spring load is transferred to the body via the lever 20 which distributes the force equally between the bracket 18 and the control member 22.

8 Claims, 3 Drawing Figures

SUSPENSION STRUT ASSEMBLY

This invention relates to a suspension strut assembly for a vehicle, the assembly being of the type comprising a telescopic damper and a main suspension spring coaxially surrounding the damper.

It is well known to incorporate in the hydraulic braking system of a motor vehicle one or more load conscious brake pressure reducing valves. The effect of such valves is that, when the system braking pressure exceeds a certain limit (known as the "cut-in" pressure), any subsequent rise in brake pressure is fully transmitted to the front brakes of the vehicle but is not fully transmitted to the rear brakes of the vehicle. Such valves include means for sensing the loading of the vehicle in order to modify the cut-in pressure.

One convenient means for sensing the vehicle loading is to detect the spring force present in the vehicle suspension springs. Various arrangements for sensing the suspension spring loading have been proposed. One particularly preferred arrangement having significant advantages over the prior art is disclosed in our British patent specification GB No. 2144499A. Whilst the arrangement shown in this publication has significant advantages, it cannot easily be used in a vehicle in which the suspension is provided by suspension struts of the type comprising a telescopic damper and a coaxially mounted main suspension spring. The preferred embodiment of the present invention provides a particularly simple arrangement in which the spring force present in the main suspension spring of this type of strut may be utilized to operate a brake pressure control valve.

According to one aspect of the present invention there is provided a suspension strut assembly for a vehicle, the assembly comprising: a telescopic damper; a main suspension spring surrounding the damper and coaxial therewith; a tubular support coaxially surrounding part of the damper and including an abutment for one end of the main suspension spring, the support being movable axially of the part of the damper which it surrounds; a brake pressure control valve mounted on the damper and located at the side therof; and means coupling the support to the control member of the valve whereby part of the load of the main suspension spring is transferred from the main suspension spring to the part of the damper upon which the valve is mounted via the support, the coupling means and the control valve.

In a particularly preferred embodiment of the invention a compensating spring acts between the damper and the tubular support in opposition to the main suspension spring whereby part of the load of the main suspension spring is transferred to the damper via the compensating spring. The balance of the spring force to be transmitted to the damper is applied to a lever, one end of which is pivotally mounted on the damper, and the other end of which rests on the control member of the control valve. With this arrangement, the control valve can be located close to the side of the damper with the axis of the control valve parallel to the axis of the damper.

Preferably, the compensating spring acts on the tubular support via an abutment collar which is itself adjustable axially of the tubular support. In this manner, the magnitude of the compensating force applied to the tubular support can readily be adjusted.

The invention will be better understood from the following description of a preferred embodiment thereof, given by way of example only, reference being had to the accompanying drawings wherein.

Figure 1:
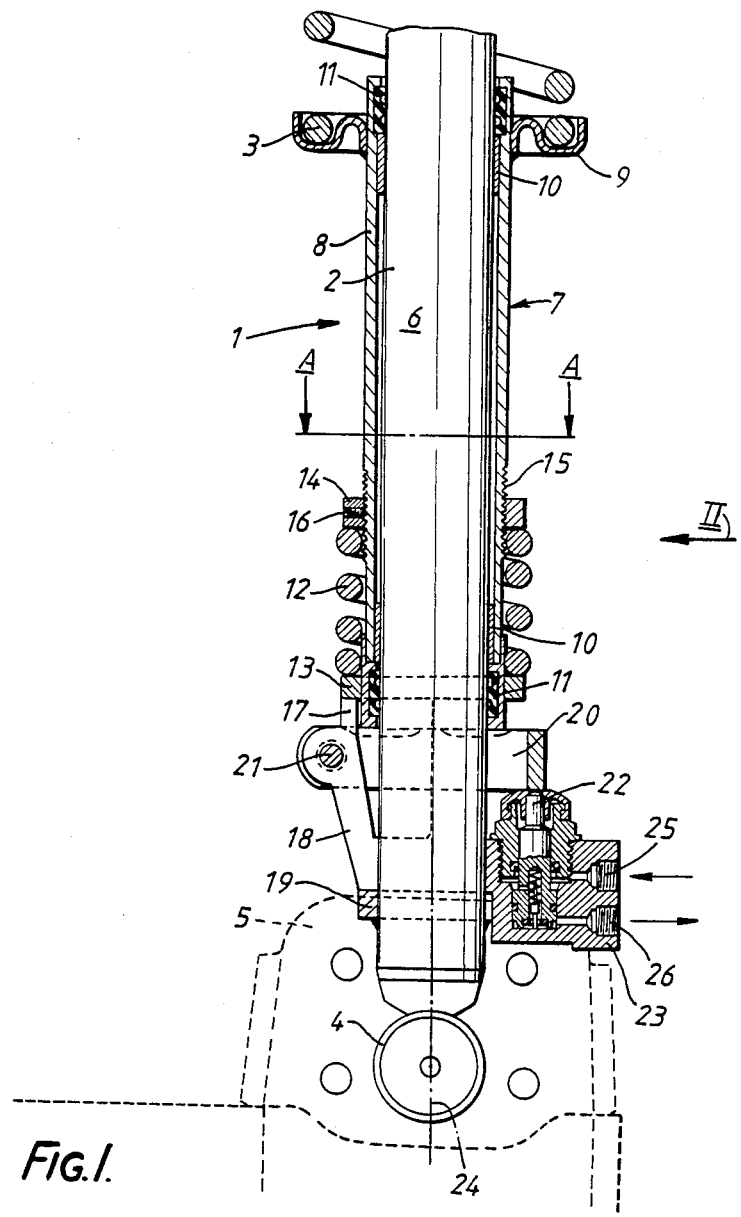
FIG. 1 shows part of a rear suspension strut.
Figure 2:
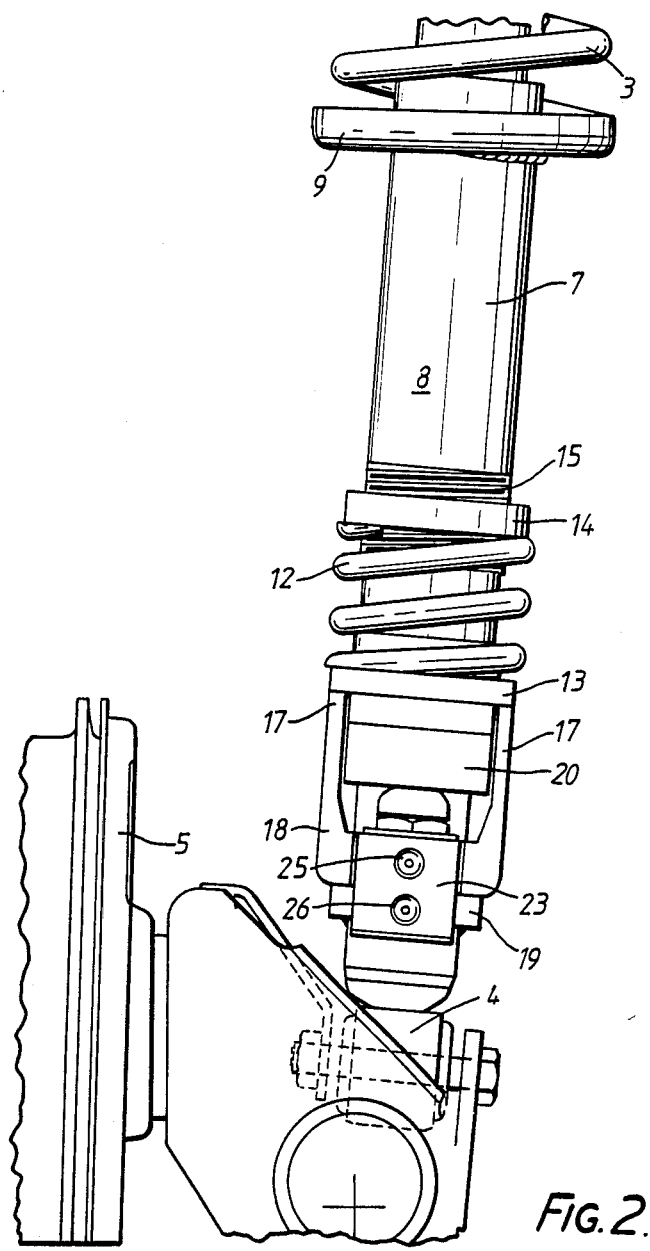
FIG. 2 is a view of the suspension strut of FIG. 1 taken in the direction of arrow II of FIG. 1.
Figure 3:
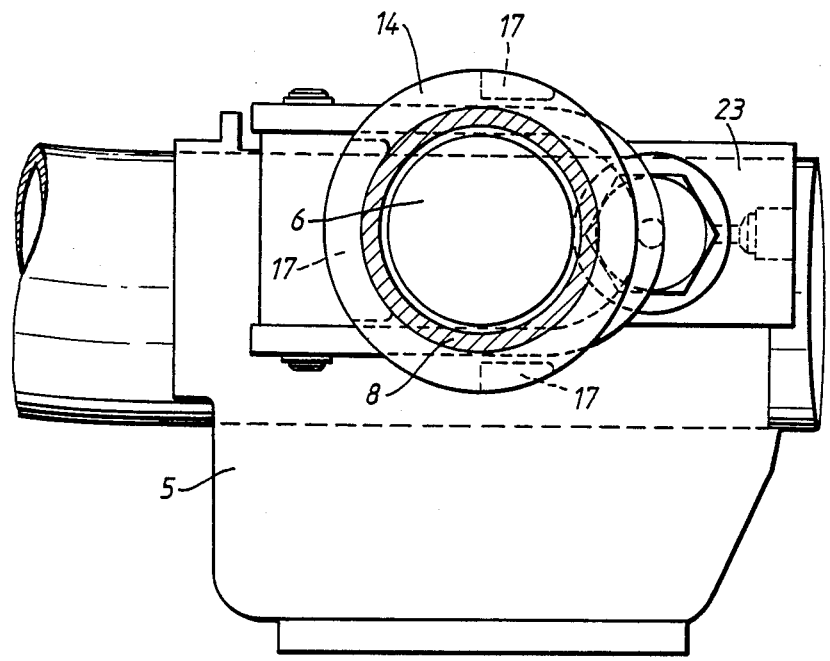
FIG. 3 is a cross-sectional view, on an enlarged scale, taken on the line A—A of FIG. 1.

FIGS. 1 and 2 show part of a suspension strut 1 forming the rear suspension of one wheel of a motor vehicle. The strut includes a telescopic hydraulic damper 2 and a main suspension spring 3 coaxially surrounding the damper. The upper end of the suspension spring 3 is, in conventional manner, supported on a support plate which is secured either directly to the end of the piston rod of the damper, or is secured to the body of the vehicle surrounding the mounting point for the end of the piston rod. The arrangement at the upper end of the strut is conventional, and will be well understood by those skilled in the art.

The lower end of the suspension strut is in the form of an eye 4 which is connected in conventional manner to a stub axle assembly 5.

The main body 6 of the damper, in which is housed the piston and damping fluid of the damper, is surrounded by a tubular support 7 which comprises an elongate tube 8 having secured thereto, e.g. by welding, an abutment plate 9 on which the main suspension spring 3 is seated. The tubular support 7 is movable axially of the body 6, and to this end is mounted via bushes 10 and is provided with seals 11 to prevent water and road dirt entering the annular space between the tube 8 and body 6.

A compensating spring 12 is supported on a ring 13 and reacts against a collar 14 which is mounted via screw-threads 15 on the tube 8 such that its axial position relative to the tube 8 can be adjusted by rotation relative to the tube 8. A locking screw 16 is provided to fix the collar 14 in any desired axial position. The ring 13 is supported on fingers 17 of a bracket 18 which rests on a further ring 19 secured, e.g. by welding, to the body 6. Therefore, the compensating spring 12 acts between the tubular support 7 and the body 6 to apply to the tubular support 7 a force in opposition to that applied by the suspension spring 3.

The net spring force acting on the support member 7, i.e. the force of main suspension spring 3 less the force of compensating spring 12, is transferred from the lower end of the tube 8 to a lever 20 which is pivotally mounted by means of pin 21 on the bracket 18, and which rests on the control member 22 of a brake pressure reducing valve 23. Since the radial distance from the axis 24 of the strut to the control member 22 is approximately the same as the radial distance from the axis 24 to the pin 21, approximately half the net force transferred to the lever 20 is transferred by pin 21 and bracket 18 to the body 6, and the remaining approximate half is transmitted to the body of the damper via the control member 22 and bracket 18 which itself forms the body of the control valve 23. If, in the alternative, it is desired to provide the control valve 23 with a separate body, this body may be secured to the bracket 18 or otherwise secured to the damper body 6.

The control valve 23 is of conventional design and provides for free passage of brake fluid from the inlet 25 to the outlet 26 until cut-in pressure is reached, whereupon the pressure at the outlet 26 rises more slowly than the pressure at the inlet 25. Increased load on the control member 22, caused by increased vehicle loading as reflected by increased main spring load, causes an increase in cut-in pressure.

The above described arrangement provides a particularly simple way of mounting the control valve 23 in a manner which enables the control member 22 to be acted upon by a force F given by the equation:

$$F = \tfrac{1}{2}(S - K)$$

Where:
S = the loading of the main suspension spring; and
K = the loading of the compensating spring.

Since movement of the tubular support 7 will be very small the extension of the compensating spring 12 will be small and the compensating force K provided by the compensating spring will be substantially constant. The value of K can be set to any value within the range provided by spring 12 by releasing screw 16 and rotating collar 14 to increase or decrease the pre-load of the spring 12.

It will be noted that a suspension spring load detected by the control member 22 will not be affected by settlement of the main suspension spring, or by variations in the spring rate of the main suspension spring. This is in contrast to systems which detect the relative position of the sprung and unsprung parts of the vehicle body as a measure of suspension loading.

Whilst the invention has been described with particular reference to a rear suspension strut a similar arrangement can, with advantage, be applied to the front suspension strut to provide the control valve for a braking system in which front suspension loading is used to control the brake pressure applied to the rear brakes.

I claim:

1. A suspension strut assembly for a vehicle comprising a telescopic damper including a body, a main suspension spring coaxially surrounding said damper body, a tubular support also coaxially surrounding the damper body and including an abutment for one end of said main suspension spring, said support being mounted on the damper body and being guided thereon for axial movement relative to the damper body in response to the loading on said main suspension spring, a brake pressure control valve assembly, said valve assembly including a valve body mounted on the side of said damper body and being relatively immovable with respect thereto and a valve control member extending from said valve body, and means, separate from said abutment for said main suspension spring coupling said support to said control member and to said damper body, said coupling means being constructed and arranged that part of the load on the main suspension spring is transmitted through it and said support to said valve control member and the remainder of said load is transmitted through said coupling means and said support to the damper body whereby the suspension spring load exerted on said control member is independent of any change in position, during use, of said main suspension spring relative to said damper body.

2. A suspension strut assembly according to claim 1 wherein the coupling means comprises a lever which is acted upon by the support, the lever being pivotally connected to the damper body and being in abutting contact with the control member of the control valve.

3. A suspension strut assembly according to claim 2 wherein the lever is pivotally connected to the damper body at one side of the damper body and acts on the control member of the control valve at the other side of the damper body, and wherein the line of action of the support on the lever is substantially mid-way between the pivot axis of the lever and the point of contact of the lever with the control member of the control valve 4. A suspension strut assembly according to claim 2 or claim 3 wherein the lever is pivotally connected to the damper body by a bracket which itself forms the body of the control valve.

5. A suspension strut assembly according to any of claim 1, 2 or 3 wherein a compensating spring acts between the damper body and the tubular support in opposition to the main suspension spring whereby part of the load of the main suspension spring is transferred to the damper body via the compensating spring.

6. A suspension strut assembly according to claim 5 wherein the compensating spring is a coil spring which surrounds the damper body and acts on the tubular support via an abutment collar which is adjustable axially of the tubular support to vary the magnitude of the compensating force applied to the tubular support by the compensating spring.

7. A suspension strut assembly according to claim 6 wherein the abutment collar is in screw threaded engagement with the tubular support and means are provided for locking the abutment collar against rotation relative to the tubular support.

8. A suspension strut assembly according to any of claims 1, 2 or 3 wherein the tubular support is slidably mounted on the damper body by means of bushes, and seals are provided to prevent the ingress of water and road dirt into the space between the tubular support and the damper body.

* * * * *